United States Patent [19]

Gelardi

[11] Patent Number: 4,775,115

[45] Date of Patent: Oct. 4, 1988

[54] SINGLE REEL TAPE CARTRIDGE USED WITH A LEADER BLOCK

[75] Inventor: Anthony L. Gelardi, Cape Porpoise, Me.

[73] Assignee: Shape Inc., Biddeford, Me.

[21] Appl. No.: 37,837

[22] Filed: Apr. 13, 1987

[51] Int. Cl.$^4$ ............................................. G11B 15/32
[52] U.S. Cl. .................................. 242/195; 242/197
[58] Field of Search ............... 242/195, 197, 198, 188, 242/76, 71.1; 226/92, 91; 352/78 R; 206/387, 389; 360/132, 95

[56] References Cited

U.S. PATENT DOCUMENTS

| | | | |
|---|---|---|---|
| 3,154,261 | 10/1964 | Breuning | 242/197 X |
| 4,383,660 | 5/1983 | Richard et al. | 242/197 |
| 4,387,864 | 6/1983 | Posso | 242/197 X |
| 4,399,936 | 8/1983 | Rueger | 226/92 |
| 4,399,959 | 8/1983 | Godsoe et al. | 226/92 X |
| 4,426,047 | 1/1984 | Richard et al. | 242/197 |
| 4,635,869 | 1/1987 | Woodley | 242/195 X |
| 4,679,747 | 7/1987 | Smith | 242/195 |
| 4,681,278 | 7/1987 | Smith | 242/195 |

Primary Examiner—Stuart S. Levy
Assistant Examiner—Joseph J. Hail, III
Attorney, Agent, or Firm—Staas & Halsey

[57] ABSTRACT

A single-reel tape cartridge containing a reel of tape with a free end attached to a leader block including a mechanism for securing the leader block in a leader block receiving well when the tape is stored in the tape cartridge. A rib is formed on one of the side walls of the tape cartridge to prevent the leader block from being driven into the tape cartridge by an external force.

5 Claims, 2 Drawing Sheets

SINGLE REEL TAPE CARTRIDGE USED WITH A LEADER BLOCK

BACKGROUND OF THE INVENTION

2. Field of the Invention

The present invention is related to single reel cartridges for magnetic tape and, in particular, to such a cartridge in which a leader block is attached to the free end of the tape to seal the cartridge when not in use and provide positive connection for automatic threading.

3. Description of the Related Art

There are many known types of single reel cartridges for magnetic tape and photographic film. One type of cartridge which is used with magnetic tape is disclosed in U.S. Pat. Nos. 4,383,660; 4,426,047; and 4,452,406. The cartridge disclosed in these patents has a structure similar to that of cartridge 10 in FIG. 1. A reel 12 of tape 14 is contained by first and second casing members 16 and 18 which are joined together by cementing or other means. The free end 14a of the tape 14 is secured to a leader block 20 by a pin 22 inserted in a slotted hole 24. The leading 26 and trailing 28 surfaces of the leader block 20 are removably secured between edges 30 and 32 of the side walls 34 and 36, respectively, of the second casing 18. The edges 30 and 32 partially define an outer aperture 37 of a receiving well 38 through which the leader block 20 passes when it is removed from the cartridge 10. The leader block 20 has a shape which permits an auto-threading device to engage the leader block 20, permitting the leader block 20 to be removed from the receiving well 38 and inserted into the hub of a takeup spool (not shown) so that the tape 14 can be smoothly wound over the trailing edge 28. These features of the leader block 20 are disclosed in U.S. Pat. Nos. 4,426,047 and 4,452,406.

A spring 40, secured by projection 42, forces a brake plate 44 against the reel 12 so that the outer surface of hub 46 fills the central aperture 48 in the first casing member 16 and a brake button 50 protrudes through the center of the hub 46; thus, substantially sealing the planar surface of the first casing member 16. As a result, the tape 14 is substantially completely enclosed by the cartridge 10 and leader block 20 when the receiving well 38 is filled by the leader blck 20, as illustrated by the solid line position of leader block 20 in FIG. 2.

The conventional construction of the cartridge illustrated in FIG. 1 is described in further detail in the above-mentioned U.S. Patents, particularly U.S. Pat. No. 4,383,660, incorporated herein by reference. However, these patents do not disclose the susceptibility of such a cartridge to a problem that is common with all single reel tape cartridges which have a free end. This problem, as described in column 1, lines 39-47 of U.S. Pat. No. 3,682,415, is the tendency of such cartridges to unwind due to the leader (free end 14a) becoming unsecured and falling into the enclosing cartridge. Although the leader block 20 provides a better than usual solution to this problem, conventional cartridges constructed as disclosed in U.S. Pat. No. 4,383,660 have been known to have the leader block 20 driven into the interior of the cartridge 10 by an external force. Due to the construction of these cartridges, it is extremely difficult to retrieve the leader block 20 from the interior of the cartridge 10 without damaging one or both of the casing members 16 and 18.

SUMMARY OF THE INVENTION

An object of the present invention is to provide a single reel tape cartridge with a leader block attached to the free end of a reel of tape contained therein, the cartridge being constructed so as to prevent the leader block from being driven into the interior thereof.

Another object of the present invention is provide a single reel tape cartridge for use with a leader block attached to the free end of the tape contained therein, the cartridge providing improved positioning of the leader block during insertion and removal of the leader block by an automatic threading device.

The above objects are obtained by providing a cartridge shell for holding an elongated web wound on a reel having first and second flanges, each flange having an end surface facing away from the web, the web having a free end attached to a generally rectangular shaped leader block having leading and trailing surfaces. The cartridge shell comprises a first casing member, substantially covering the end surface of the first flange of the reel, having side walls extending substantially perpendicular to the first flange; a second casing member, substantially covering the end surface of the second flange of the reel, having side walls extending substantially perpendicular to the second flange and joined to the side walls of the first casing member to partially enclose the reel; and a leader block receiving well, formed in the side walls of the first and second casing members, for securing the leader block when the web is stored in the cartridge shell. The leader block receiving well includes first and second end walls formed of the first and second casing members and extending substantially parallel to the first and second flanges, having edges facing outward; first and second side-wall extensions, extending from the side walls of the first and second casing members, respectively, having interior surfaces facing towards the reel and edges for supporting the trailing surface of the leader block; third and fourth side-wall extensions from the side walls of the first and second casing members, respectively, having edges for supporting the leading surface of the leader block; first and second back walls, extending substantially perpendicular to and abutting the first and second end walls and abutting the third and fourth side-wall extensions, respectively, having edges defining an inner aperture, interior surfaces facing the reel and exterior surfaces facing an outer aperture defined by the edges of the end walls and the side-wall extensions, the leader block passing through only the outer aperture and the web passing through both the inner and outer apertures when the leader block is withdrawn from the cartridge shell; and a rib, extending substantially perpendicular to and abutting the second end wall, formed along the second side-wall extension and projecting from the second side-wall extension on the interior surface thereof, for preventing the trailing surface of the leader block from entering the inner aperture.

Preferably, the rib on the second casing member has a length measured perpendicular to the second flange and a width measured parallel to the second flange, the width being smaller than the length. The cartridge shell is preferably constructed with the second casing member having side walls with a height measured perpendicular to the flanges that is twice the height of the side walls of the first casing member. For such a cartridge, the length of the rib is preferably approximately eighty-five percent (85%) of the height of the side-wall extension or approximately four-tenths of an inch (0.4") for a cartridge of conventional size.

These objects, together with other objects and advantages which will subsequently apparent, reside in the details of construction and operation as more fully hereinafter described and claimed, reference being had to accompanying drawings forming a part hereof.

DESCRIPTION OF THE PREFERRED EMBODIMENT

Figure 1:
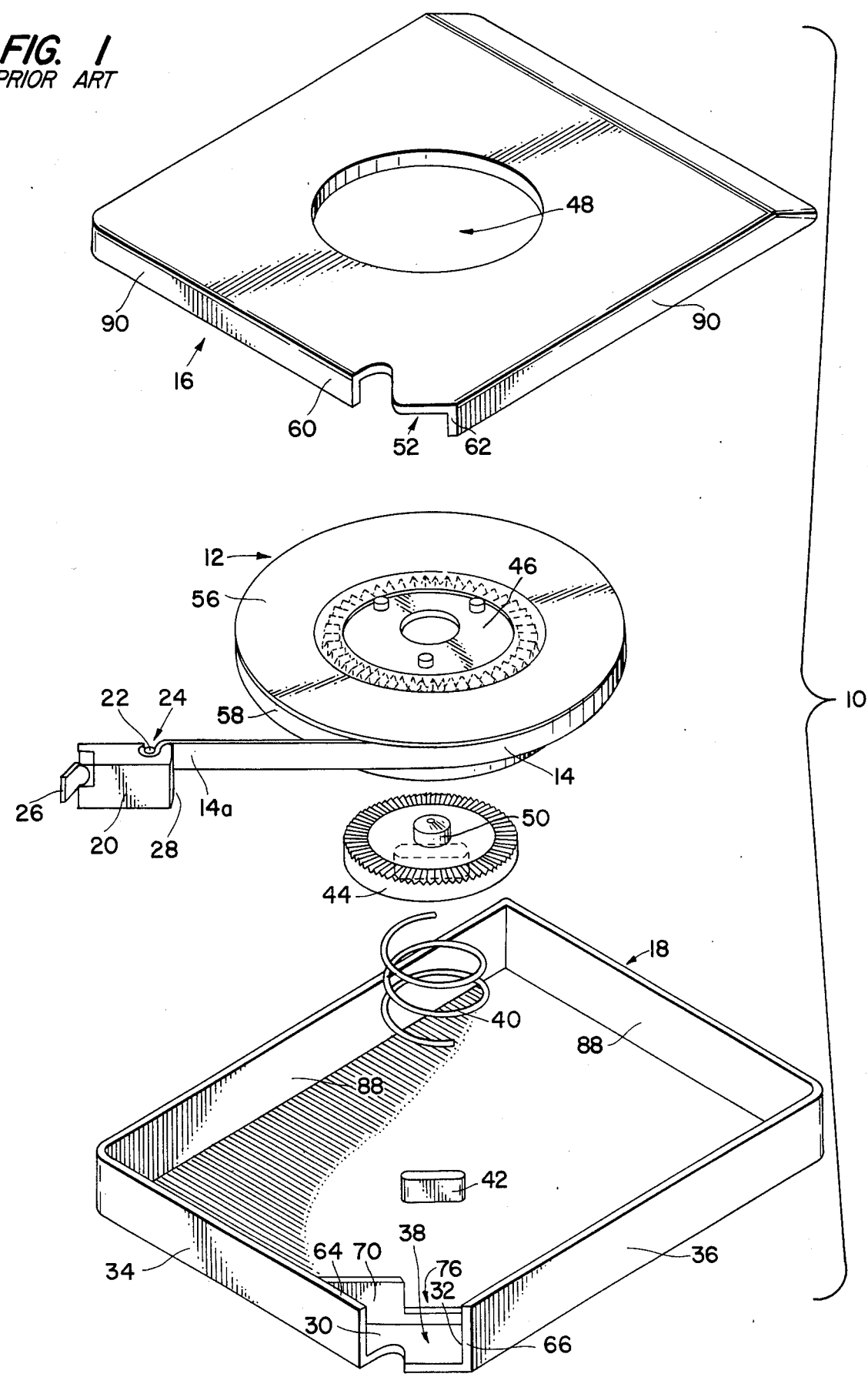
FIG. 1 is a exploded perspective view of a prior art cartridge of the type described in the Background of the Invention.
Figure 3:
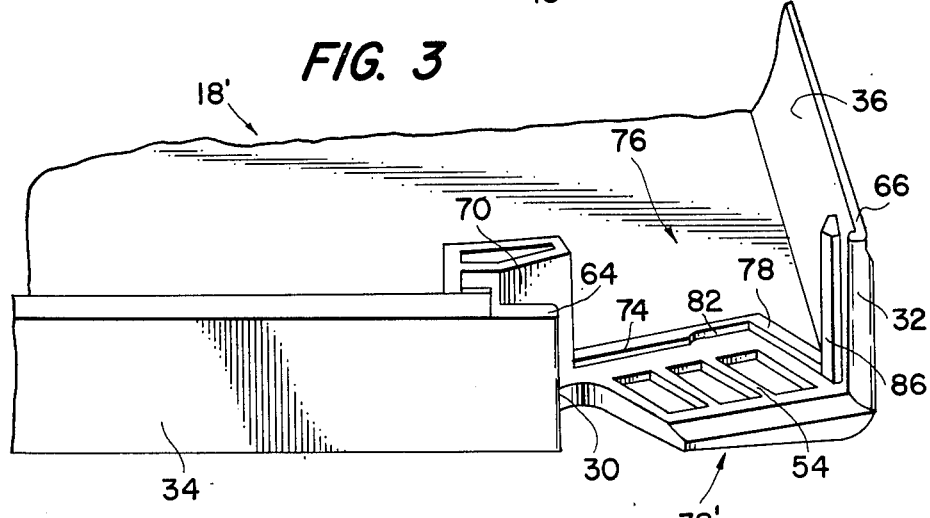
FIG. 3 is a perspective view of a leader block receiving well according to the present invention.
Figure 4:
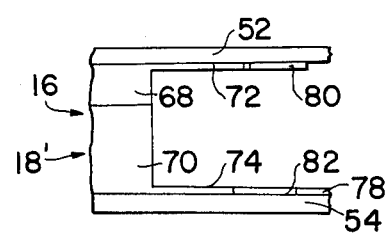
FIG. 4 is a side view of a leader block receiving well according to the present invention.

According to the present invention and as best shown in FIGS. 3 and 4, the top and bottom of leader block receiving well 38' is defined by end walls 52 and 54 which are formed of the first and second casing members 16 and 18', respectively, and extend substantially parallel to flanges 56 and 58 of the reel 12. The interior surface of end wall 54 is best illustrated in FIG. 3 and end wall 52, which has an exterior illustrated in FIG. 1, is constructed in a similar manner. The sides of the leader block receiving well 38' are defined by side-wall extensions 60 and 62 which are integrally formed of the first casing member 16, side-wall extensions 64 and 66 which are integrally formed of the second casing member 18', and back walls 68 and 70 which are best illustrated in FIGS. 3 and 4.

Figure 2:
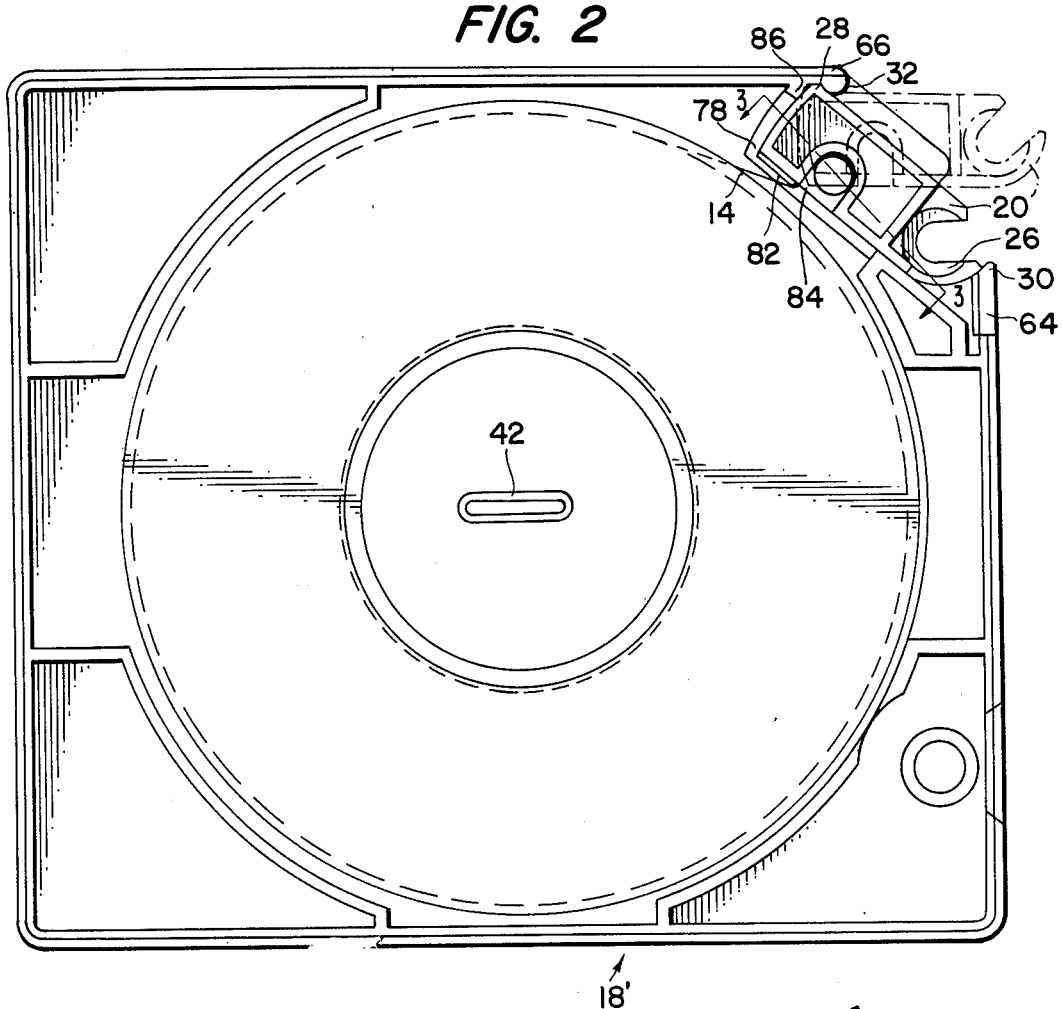
FIG. 2 is a plan view of a second casing member according to the present invention, depicting removal of the leader block.

The back wall 68, integrally formed of the first casing member 16, and the back wall 70, integrally formed of the second casing member 18', have reduced height extensions 72 and 74, respectively, which frame the top and bottom of an inner aperture 76 through which the tape 14 passes when the leader block 20 is withdrawn from the cartridge 10. As illustrated in FIG. 4, the reduced height extension 72 of back wall 68 extends only in a direction parallel to the remainder of back wall 68, while, as best illustrated in FIGS. 2 and 3, the reduced height extension 74 of back wall 70 includes a slightly curved portion 78 which extends in a direction roughly perpendicular to he remainder of back wall 70. In addition, both extensions 72 and 74 of back walls 68 and 70 include notched portions 80 and 82, respectively, which permit the corner 84 of the leader block 20 to have some additional room when the leader block 20 is moved from the position illustrated by the solid lines in FIG. 2 to the position illustrated by the phantom lines in FIG. 2.

As best illustrated in FIG. 2, the leader block 20 is secured in the leader block receiving well 38' by contact between the edges 30 and 32 of the side-wall extensions 64 and 66 and the leading surface 26 and trailing surface 28 of the leader block 20. In addition, as illustrated in FIGS. 2 and 3, a rib 86 is preferably formed on side-wall extension 66 in such a manner that the trailing surface 28 of the leader block 20 is securely positioned. The location of the rib 86 on the second casing member 18', rather than the first casing member 16, increases the effectiveness of the rib 86. Conventionally, as illustrated in FIG. 1, the side walls 34, 36 and 88 of the second casing member 18 are typically twice as high as the side walls 90 of the first casing member 16. This ratio of side-wall heights is also true for casing members 16 and 18' of a cartridge constructed according to the present invention. Also, the leading edge 26 of the leader block 20 does not run the full height of the leader block 20, but rather is approximately the same height as the side walls 34, 36 and 88, and more importantly, the same height as the side-wall extension 64 of the second casing member 18 or 18'. The leader block 20 is constructed in this manner to permit positive connection with an arm of an automatic threading system as disclosed in U.S. Pat. Nos. 4,426,047 and 4,452,406, incorporated herein by reference.

As a result of the difference in side wall heights between the first and second casing members 16 and 18, the rib 86 has a length, measured perpendicular to the flanges 56 and 58 of the reel 12, which is more than one-half of the height of the leader block 20 and thus provides a much more significant barrier to the leader block 20 than the reduced height extensions 72 and 74 of the back walls 68 and 70. The rib 86 is preferably constructed with a width, measured parallel to the flanges 56 and 58, that is, as illustrated in FIGS. 2 and 3, significantly smaller than the length of the rib 86. In addition, the length of the rib 86 may be slightly less than the height of the side-wall extension 66 to which it is attached and from which it projects toward the interior of the cartridge 10. For example, the length of the rib 86 may be approximately eighty-five percent (85%) of the height of the side-wall extension 66. In a tape cartridge having a conventional size, the rib 86 would be approximately four tenths (0.4) of an inch.

The many features and advantages of the present invention are apparent from the detailed specification, and thus, it is intended by the appended claims to cover all such features and advantages of the device which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to falling within the scope and spirit of the invention.

What is claimed is:

1. A cartridge shell for holding an elongated web wound on a reel having first and second flanges, each flange having an end surface facing away from the web, the web having a free end attached to a generally rectangular shaped leader block having leading and trailing surfaces, said cartridge shell comprising:

a first casing member, substantially covering the end surface of the first flange of the reel, having side walls extending substantially perpendicular to the first flange;

a second casing member, substantially covering the end surface of the second flange of the reel, having side walls extending substantially perpendicular to the second flange and joined to the side walls of said first casing member to partially enclose the reel; and a leader block receiving well, formed in the side walls of said first and second casing members, for securing the leader block when the web is stored in said cartridge shell, said leader block receiving well including first and second end walls formed of said first and second casing members, extending substantially parallel to the first and second flanges and having edges facing outward, first and second side-wall extensions extending from the side walls of said first and second casing members, respectively, having interior surfaces facing towards the reel and having edges for supporting the trailing surface of the leader block, third and fourth side-wall extensions extending from the side walls of said first and second casing members, respectively, and having edges for supporting the leading surface of the leader block, first and second back walls extending substantially perpendicular to and abutting the first and second end walls, abutting said third and fourth side-wall extensions, respectively, having edges defining an inner aperture, having interior surfaces facing the reel and having exterior surfaces facing an outer aperture defined by the edges of said end walls and said side-wall extensions, the leader block passing through only the outer aperture and the web passing through both the inner and outer apertures when the leader block is withdrawn from the cartridge shell, and a rib, extending substantially perpendicular to and abutting said second end wall, having a largest dimension extending in a direction perpendicular to the first and second flanges along said second side-wall extension and projecting from said second side-wall extension on the interior surface thereof, for preventing the trailing surface of the leader block from entering the inner aperture.

2. A cartridge shell as recited in claim 1, wherein said rib has a length measured perpendicular to the second flange and a width measured parallel to the second flange, the width being smaller than the length.

3. A cartridge shell as recited in claim 1, wherein said first casing member has a central aperture for permitting the reel to be driven by external means.

4. A cartridge shell for holding an elongated web wound on a reel having first and second flanges, each flange having an end surface facing away from the web, the web having a free end attached to a generally rectangular shaped leader block having leading and trailing surfaces, said cartridge shell comprising:

a first casing member, substantially covering the end surface of the first flange of the reel, having side walls extending a first distance measured perpendicular to the first flange;

a second casing member, substantially covering the end surface of the second flange of the reel, having side walls extending a second distance measured perpendicular to the second flange and joined to the side walls of said first casing member to partially enclose the reel; and a leader block receiving well, formed in the side walls of said first and second casing members, for securing the leader block when the web is stored in said cartridge shell, said leader block receiving well including first and second end walls formed of said first and second casing members, extending substantially parallel to the first and second flanges and having edges facing outward, first and second side-wall extensions extending from the side walls of said first and second casing members, respectively, having interior surfaces facing towards the reel and having edges for supporting the trailing surface of the leader block, third and fourth side-wall extensions extending from the side walls of said first and second casing members, respectively, and having edges for supporting the leading surface of the leader block, first and second back walls extending substantially perpendicular to and abutting the first and second end walls, abutting said third and fourth side-wall extensions, respectively, having edges defining an inner aperture, having interior surfaces facing the reel and having exterior surfaces facing an outer aperture defined by the edges of said end walls and said side-wall extensions, the leader block passing through only the outer aperture the and web passing through both the inner and outer apertures when the leader block is withdrawn from the cartridge shell, and a rib, extending substantially perpendicular to and abutting said second end wall, formed along said second side-wall extension and projecting from said second side-wall extension on the interior surface thereof, and having a length measured perpendicular to the first and second flanges, the length of said rib being approximately eighty-five percent of the second distance, said rib preventing the trailing surface of the leader block from entering the inner aperture.

5. A cartridge shell as recited in claim 4, wherien the length of said rib is approximately four tenths of an inch.

* * * * *